March 17, 1953 R. M. WITT 2,631,807
TACKLE BOX SUPPORT
Filed April 25, 1950 2 SHEETS—SHEET 1
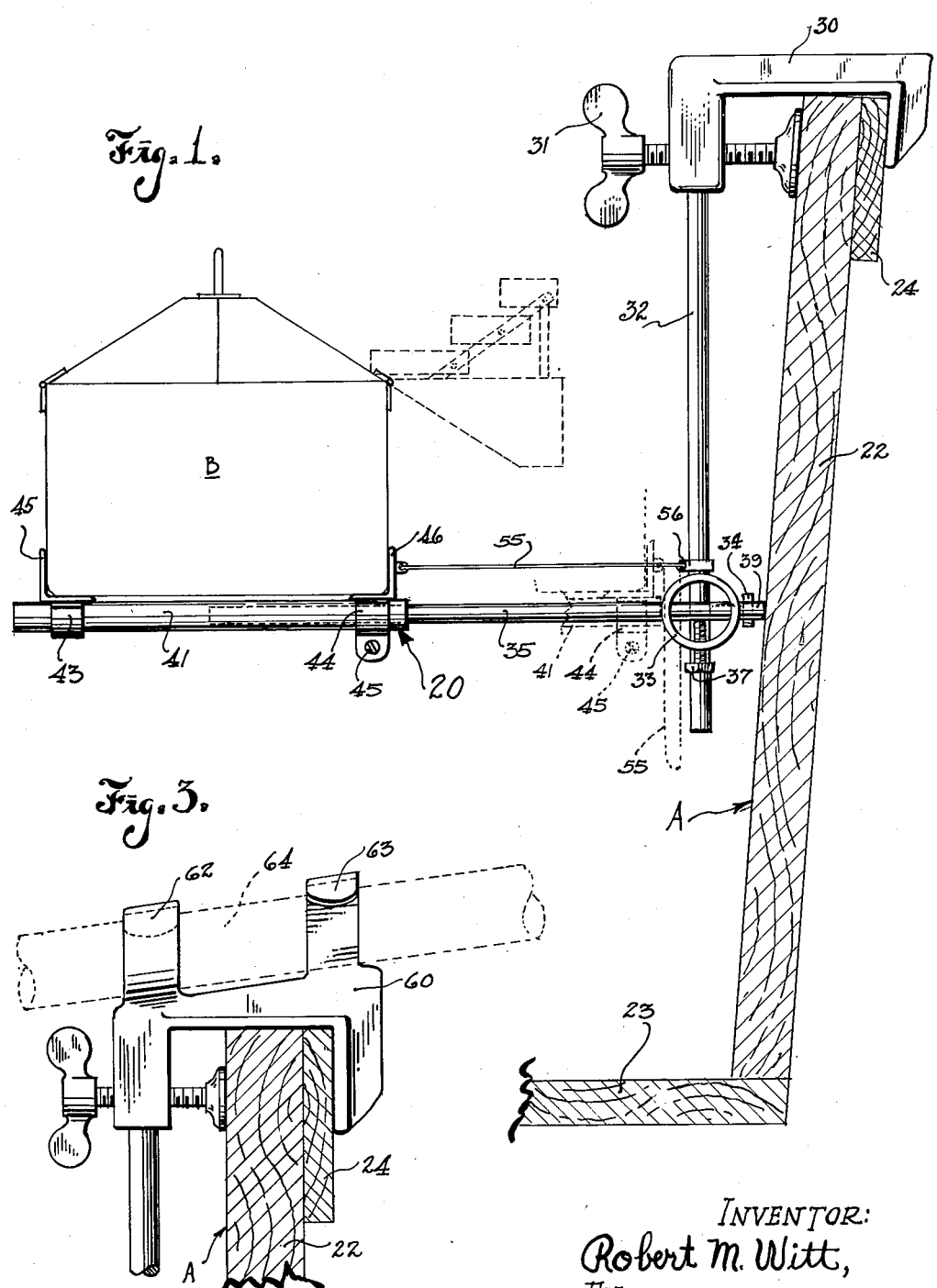
INVENTOR:
Robert M. Witt,
BY:
Joseph M. Gartner
ATTY.

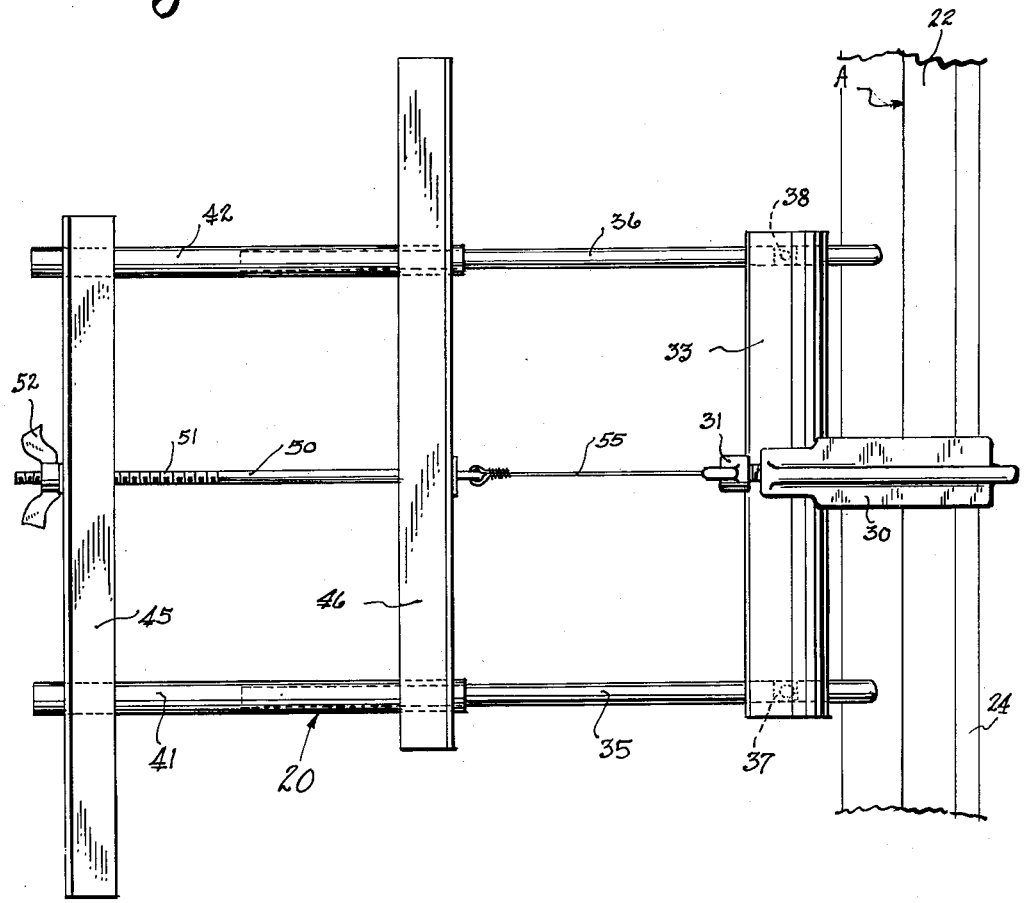

Patented Mar. 17, 1953

2,631,807

UNITED STATES PATENT OFFICE 2,631,807

TACKLE BOX SUPPORT

Robert M. Witt, North Riverside, Ill.

Application April 25, 1950, Serial No. 157,950

3 Claims. (Cl. 248—229)

This invention generally relates to a support for a fishing tackle box particularly adaptable for securement to the side of the boat for convenient access thereto and to support the box substantially above the bottom of the boat and out of the water usually found in the bottom of a fishing boat.

Ordinarily, the fisherman places his tackle box on a seat or in the bottom of the boat where it was subject to being knocked or kicked over in the excitement of catching a fish and the contents of the box may be spilled out into the water and dirt usually found in the bottom of a fishing boat. In such a case as this the fish lines may become wet and much time is expended and wasted in replacing the articles in the box and drying the lines. More important, there is a chance that the fisherman may lose the fish because of the disturbance.

It is recognized that in the prior art, numerous attempts have been made to provide supporting brackets for books and other articles; however, these prior art brackets could not be adapted for the purposes contemplated by this invention and, to the best of the applicant's knowledge, only very few of the prior art structures have had limited successful application and have been accorded only limited commercial recognition. It is believed that this fact results from the apparent deficiencies of the prior art structures, their non-adaptability for universal application, and their expensive construction which so greatly increased the cost as to seriously handicap general sales acceptance.

The present improvements in a support for a tackle box are directed to simplify the construction and the mode of operation thereof, and also to provide a unitary assembly which may readily and conveniently be employed universally to to support various sized and shaped tackle boxes presently being manufactured.

Therefore, it is an important object and accomplishment of the invention to provide for tackle boxes a support having adjustable means to accommodate various sized and shaped tackle boxes and which is adapted for securement to a side of a boat for convenient access to the contents of the tackle box.

A further object and accomplishment of the invention is to provide for tackle boxes a support having means for adjusting the respective position of the tackle box for convenient access thereto coupled with means for securely clamping and holding the tackle box to prevent knocking and/or kicking over of the tackle box and spilling the contents thereof which could cause waste of time, damage and even loss of the fishing tackle.

Another object and accomplishment of the invention is to provide an improved unitary assembly effective to support a tackle box by co-relating and especially designing the various elements thereof, whereby there shall be such co-operation between the improved elements as will best serve the purpose of providing an efficient unit capable of being manufactured at low cost and yet giving the maximum of satisfactory service in use.

The invention seeks, as a further object and accomplishment, to provide for tackle boxes a support as contemplated herein and particularly characterized by a design arrangement to more advantageously and satisfactorily perform the functions required of it and adapted to provide a compact unit which will successfully combine the factors of structural simplicity and durability, and yet be economical to manufacture.

Additional objects, features and advantages of the invention disclosed herein will be apparent to persons skilled in the art after the construction and operation are understood from the within description.

It is preferred to accomplish the various objects of this invention and to practice the same in substantially the manner as hereinafter more fully described, and as more particularly pointed out in the appended claims.

With the above and other incidental objects in view, the invention has other marked improvements and superiorities which radially distinguish it from presently known structures, these improvements in the invention residing in the novel construction and cooperative function of the parts thereof, the combination of the parts and the arrangement thereof as illustrated in the drawings, and which will be more fully described hereinafter and particularly pointed out in the claims.

In the accompanying drawings on which there is shown preferred embodiments of the invention, Fig. 1 is a side elevational view of a support for tackle boxes embodying the features of the present invention and illustrating a conventional tackle box in operative position with the device in its extended position, the retracted position being shown by broken lines to illustrate more clearly the range of movement;

Fig. 2 is a top plan view of the support for a tackle box depicted in Fig. 1 with the tackle box removed to illustrate more clearly the construction thereof; and Fig. 3 is a fragmentary elevational view of a modified form of clamp embodying the feature of a fish pole holder contemplated as a part of the support for tackle boxes with which the invention is particularly concerned.

The drawings are to be understood to be more or less of a schematic character for the purpose of illustrating and disclosing typical or preferred forms of the improvements contemplated herein and in the drawings like reference characters identify the same parts in the several views.

As one possible example of advantageous employment of the tackle box support contemplated by this invention, reference is made to the drawings, particularly Fig. 1, wherein there is illustrated the tackle box support with which the present invention is particularly concerned and generally indicated in its entirety by the numeral 20 as being secured in operative position to a boat indicated in its entirety by the letter A and which may comprise a side board 22 with a bottom 23 suitably secured thereto, said side board 22 having the usual feature strip 24 attached thereto. Although the instant tackle box is illustrated as being secured to the side board 22 of the boat A, it is obvious that the tackle box support 20 may be secured to the backboard (not shown) of the boat or any other convenient place to which the instant tackle box support could be adapted.

Suffice it to say, since the invention is not particularly concerned with the precise construction of the boat A as illustrated, and/or its associated parts, they will not be further described in detail, and it is deemed sufficient for all intentions and purposes herein contained to show only portions thereof adjacent to and cooperating with the tackle box support contemplated herein. It is to be understood that details of construction of such boats with which the tackle box support contemplated herein may advantageously be employed and/or their associated parts, may be modified to suit particular conditions or to satisfy the engineering genius of various manufacturers, and I do not wish to be limited to the construction of these elements as set forth except where such construction particularly concerns the invention contemplated herein.

Having thus described, by way of example, a possible adaptation of the instant tackle box support, and having generally described the environment surrounding the adaptation, the specific construction and cooperative functions of the parts of the instant tackle box support with which the present invention is particularly concerned, will now be described in detail.

In the exemplary embodiment of the invention depicted in Figs. 1 and 2, the tackle box support 20 comprises, in general, a U-shaped bracket 30 having a wing nut 31 adapted to retain the support 20 to the side board 22 of the boat A, a vertically extending shaft 32 with the upper portions thereof being suitably secured to the bracket 30 and having at the lower portions thereof a horizontally extending tubular member 33 provided with a set screw 34 having end portions thereof engageable with said shaft 32 and adapted to permit vertical adjustment of the tubular member 33 with respect to the shaft 32, a pair of spaced horizonally projecting members 35 and 36 adjustably carried by said tubular member 33 by means of set screws 37 and 38 respectively having end portions thereof engageable with said members 35 and 36 which are respectively provided with projecting end portions 39 and 40 adapted to engage the side board of the boat as shown, and said members 35 and 36 respectively having telescoping tubular members 41 and 42 adapted to move in a horizontal plane to an extended position as shown in full lines in Fig. 1 and a retracted position as shown partially by the dotted lines in Fig. 1.

Carried by the two telescoping members 41 and 42 are transversely projecting angles 45 and 46 adapted to clamp the fishing tackle box B therebetween. The clamping action is accomplished by having the angle 45 slidable on the telescoping members 41 and 42 by the provision of sleeve brackets such as at 43 while the angle 46 is adjustably but fixedly held in position by the provision of clamping brackets such as at 44 and provided with an adjustable clamping screw 45.

In order to provide a grip on the tackle box B disposed between the angles 45 and 46 there is provided a screw means 50 (Fig. 2) one end of which is suitably secured to the angle 46 and the other end portions being provided with threaded formations 51 adapted to receive the thumb screw 52 which, when tightened, will cause the angle 45 to move toward the angle 46 thereby gripping the tackle box therebetween.

Attention is invited to the chain or wire means 55 which may be suitably secured as shown to the back face of the angle 46 and to the vertical shaft 32 by means of the encircling clamp 56 in order to prevent movement of the telescoping members 41 and 42 too far to the left as shown in Fig. 1. When the telescoping members are in their retracted position the wire means 55 will hang loosely as shown in the dotted lines in Fig. 1. It is important to understand that the telescoping members can be moved to any position between the limits of the retracted position and the extended position to satisfy the desires of the user.

In this connection it can be seen that when the assembly is in its intended position as shown in Fig. 1, the tackle box may be opened and the covers and trays may be extended for convenient work in the tackle box.

Because of the adjustability of the angle 46 which may be accomplished by virtue of the clamping brackets as at 44, and coupled with the operation of the screw means 50 and the staggered relationship of the angles 45 and 46, the device may be arranged to accommodate various sized and shaped tackle boxes without necessitating alteration or modification of structure. This is a very important feature of the invention.

Another important feature is the universal adjustability of the device in both horizontal and vertical planes in order to conveniently adapt the device to substantially any type of boat regardless of angularity of the side boards.

The horizontal adjustments are accomplished by the proper positioning of the spaced horizontally projecting members 35 and 36 with respect to the tubular member 33 so as to effect proper engagement of the projecting portions 39 and 40 with the sideboard of the boat. The members 35 and 36 are held in the adjusted position by the set screws 37 and 38 respectively.

It is obvious that, in making the aforementioned adjustments, consideration should be given to the vertical adjustments which may be accomplished by proper positioning of the vertical shaft 32 with respect to the tubular member 33 and thereafter applying the set screw 34.

In some adaptations of the instant tackle box support it has been found advantageous to incorporate with the modified bracket 60, as shown in Fig. 3, a fish pole holder means comprising oppositely disposed open loops 62 and 63 adapted to partially encircle the end portions of a fish pole 64, thereby to hold the pole for quick removal and to free the fisherman's hands for other work.

From the foregoing disclosure, it may be observed that I have provided a tackle box support which efficiently fulfills the objects thereof as hereinbefore set forth and which provides numerous advantages which may be summarized as follows:

1. Structurally simple, efficient and durable;
2. Economical to manufacture and readily adaptable to mass production manufacturing principles; and
3. The provision of a tackle box support having adjustable means to accommodate various sized and shaped tackle boxes and which is adapted for securement to a side of a boat for convenient access to the contents of the box.

While I have illustrated preferred embodiments of my invention, many modifications may be made without departing from the spirit of the invention, and I do not wish to be limited to the precise details of construction set forth, but wish to avail myself of all changes within the scope of the appended claims.

I claim:

1. A tackle box support comprising clamp means for suspending said support from the side of a boat, a vertically extending shaft carried by said clamp means, tubular means carried by said shaft for movement in a vertical plane responsive to operation of a set screw forming a part of said tubular means, a pair of spaced horizontally projecting members carried by said tubular means for movement in a horizontal plane, a pair of telescoping members respectively carried by said spaced members for sliding movement in a horizontal plane, grip means adjustably carried by said telescoping members and adapted to grip said tackle box therebetween, and means connected between said grip means and said shaft to restrict movement of said telescoping members.

2. A tackle box support comprising a U-shaped bracket having a wing nut adapted to retain said support to the sideboard of a boat, a vertically extending shaft with the upper portions thereof being secured to said bracket, a horizontally extending tubular member carried by said shaft and provided with a set screw having end portions thereof engageable with said shaft and adapted to permit vertical adjustment of the tubular member with respect to the shaft, a pair of spaced horizontally projecting members adjustably carried by said tubular member with projecting end portions adapted to engage the sideboard of the boat, a pair of telescoping members respectively carried by said spaced members for sliding movement in a horizontal plane, and grip means adjustably carried by said telescoping members and adapted to grip said tackle box therebetween.

3. The structure claimed in claim 2 including means connected between the grip means and the shaft to restrict movement of said telescoping members.

ROBERT M. WITT.

REFERENCES CITED

The following references are of record in the file of this patent:

UNITED STATES PATENTS

| Number | Name | Date |
| --- | --- | --- |
| 602,055 | Campbell | Apr. 12, 1898 |
| 895,833 | Aungst | Aug. 11, 1908 |
| 1,981,294 | Wangen | Nov. 20, 1934 |
| 2,084,643 | Johnson | June 22, 1937 |